United States Patent
Schmid

(10) Patent No.: US 9,836,689 B2
(45) Date of Patent: Dec. 5, 2017

(54) SHIELD ELEMENT FOR MOUNTING ON AN OBJECT

(71) Applicant: SEIBERSDORF LABOR GMBH, Seibersdorf (AT)

(72) Inventor: Gernot Schmid, Bromberg (AT)

(73) Assignee: Seibersdorf Labor GmbH, Seibersdorf (AT)

( * ) Notice: Subject to any disclaimer, the term of this patent is extended or adjusted under 35 U.S.C. 154(b) by 0 days.

(21) Appl. No.: 15/116,368

(22) PCT Filed: Jan. 19, 2015

(86) PCT No.: PCT/AT2015/050015
§ 371 (c)(1),
(2) Date: Aug. 3, 2016

(87) PCT Pub. No.: WO2015/113087
PCT Pub. Date: Aug. 6, 2015

(65) Prior Publication Data
US 2016/0350641 A1    Dec. 1, 2016

(30) Foreign Application Priority Data
Feb. 3, 2014  (AT) .............................. A 50077/2014

(51) Int. Cl.
*G06K 19/077* (2006.01)
*G06K 19/073* (2006.01)
*G06K 19/00* (2006.01)

(52) U.S. Cl.
CPC ... *G06K 19/07773* (2013.01); *G06K 19/0739* (2013.01); *G06K 19/07309* (2013.01);
(Continued)

(58) Field of Classification Search
CPC ....... G06K 19/07327; G06K 19/07735; G06K 19/005; G06K 19/07309; G06K 19/07345;
(Continued)

(56) References Cited

U.S. PATENT DOCUMENTS 5,365,240 A * 11/1994 Harmuth .............. H01Q 17/001
327/108
6,121,940 A * 9/2000 Skahill ..................... H01Q 9/00
343/701
(Continued)

FOREIGN PATENT DOCUMENTS

| DE | 4401089 A1 | 7/1995 |
|----|------------|--------|
| DE | 102005047048 A1 | 4/2007 |
| JP | 3548750 B2 | 7/2004 |

*Primary Examiner* — Daniel Walsh
(74) *Attorney, Agent, or Firm* — Laurence A. Greenberg; Werner H. Stemer; Ralph E. Locher

(57) ABSTRACT

A shield element for mounting on an object, in particular a flat object, such as a chip card. The object has a base body, an RFID or NFC transponder, a transponder chip and a coil-shaped transmission antenna connected to the RFID or NFC transponder chip. The shield element has a carrier made of non-conductive material. The carrier has a closed or closable conducting path which, upon mounting the shield element on the object, shields the object from the electromagnetic fields generated by an external reading device and directed at the transmission antenna of the RFID or NFC transponder chip.

19 Claims, 5 Drawing Sheets

(52) U.S. Cl.
CPC . *G06K 19/07318* (2013.01); *G06K 19/07327* (2013.01); *G06K 19/07345* (2013.01); *G06K 19/07381* (2013.01); *G06K 19/07735* (2013.01); *G06K 19/005* (2013.01)

(58) Field of Classification Search
CPC ......... G06K 19/0739; G06K 19/07381; G06K 19/07318; G06K 19/07773
See application file for complete search history.

(56) References Cited

U.S. PATENT DOCUMENTS

| | | | | |
|---|---|---|---|---|
| 6,533,178 B1* | 3/2003 | Gaul | ................ | G06K 19/0723 235/380 |
| 7,102,520 B2* | 9/2006 | Liu | ................ | G06K 19/07749 340/572.1 |
| 7,202,825 B2* | 4/2007 | Leizerovich | ............ | H01Q 1/44 343/700 MS |
| 7,233,296 B2* | 6/2007 | Song | ................... | H01Q 13/106 343/711 |
| 7,289,066 B2* | 10/2007 | Homolle | .............. | G06K 19/077 343/700 MS |
| 7,482,925 B2* | 1/2009 | Hammad | ............. | G06K 19/005 174/377 |
| 8,038,068 B2* | 10/2011 | Yuzon | .................. | G07F 7/1016 235/380 |
| 8,164,529 B2* | 4/2012 | Parsche | ................. | H01Q 7/005 343/741 |
| 8,228,199 B2* | 7/2012 | Noakes | ............ | G06K 19/07327 340/572.1 |
| 8,348,170 B2* | 1/2013 | Brod | ................ | G06K 19/07749 235/492 |
| 8,604,995 B2* | 12/2013 | Hammad | .............. | G06F 1/1616 343/702 |
| 8,902,073 B2* | 12/2014 | Busch-Sorensen | ......... | G06K 19/07336 340/10.1 |
| 2005/0012613 A1* | 1/2005 | Eckstein | .............. | G06K 7/0008 340/539.13 |
| 2006/0208886 A1* | 9/2006 | Beamer | ............ | G06K 19/07749 340/572.1 |
| 2006/0293027 A1* | 12/2006 | Hammad | ......... | G06K 19/07309 455/410 |
| 2007/0090954 A1* | 4/2007 | Mahaffey | ......... | G06K 19/07327 340/572.3 |
| 2008/0018473 A1* | 1/2008 | Tsai | ................ | G06K 19/07735 340/572.7 |
| 2009/0050699 A1* | 2/2009 | Basar | .................... | G06K 7/0091 235/436 |
| 2009/0230020 A1* | 9/2009 | Clayman | ......... | G06K 19/07327 206/719 |
| 2009/0277964 A1* | 11/2009 | Schroder | ............ | G06K 19/0726 235/435 |
| 2009/0309703 A1* | 12/2009 | Forster | ............... | G06K 7/10178 340/10.1 |
| 2010/0328922 A1* | 12/2010 | Peters | .............. | G06K 19/07327 361/816 |
| 2011/0199713 A1* | 8/2011 | Kato | ............... | G06K 19/07718 361/212 |
| 2014/0374488 A1* | 12/2014 | Biro | ................. | G06K 19/07327 235/492 |
| 2015/0171911 A1* | 6/2015 | Yang | ...................... | H04B 1/3838 455/280 |
| 2015/0244421 A1* | 8/2015 | Nambord | .................. | H01Q 7/00 455/41.1 |
| 2015/0372721 A1* | 12/2015 | Bard | .................... | H04B 5/0075 455/575.8 |
| 2016/0104937 A1* | 4/2016 | Kumura | ................ | H01Q 1/2208 343/788 |
| 2016/0350641 A1* | 12/2016 | Schmid | ............ | G06K 19/07309 |

\* cited by examiner

SHIELD ELEMENT FOR MOUNTING ON AN OBJECT

BACKGROUND OF THE INVENTION

Field of the Invention

The invention relates to a shield element for attachment to an object, which is NFC-capable in particular, to prevent wireless data transmission. An object can be understood in this context as any arbitrary object, in which an RFID/NFC transponder can theoretically be installed, in particular chip cards and passports, for example. However, the invention is in no way restricted to this type of objects, but rather functions with all different types of objects having an RFID/NFC transponder.

In the course of the propagation of RFID and/or NFC technology and the applications thereof in the mass market, contactless smart cards are also becoming more and more widespread, for example, check cards or credit cards, on which sensitive personal data are stored, for example, health insurance card, passport, driver license, etc., and/or which enable cashless payment at corresponding NFC terminals in retail trade, for example, "Paypass" in Austria. By means of corresponding read devices or read terminals, data can be read out from these cards in a contactless manner at distances of up to approximately 5 cm. Using correspondingly stronger read devices, which do not conform to the standards, but are certainly easily implementable, however, it is also possible to achieve substantially greater read ranges if there is an intention to defraud.

For this reason, more concerns are increasingly being expressed by data protection organizations with respect to the endangerment of data protection and/or possible financial damage due to unauthorized and/or unintentional readout of such cards. To prevent unauthorized and/or unintentional data accesses to such smart cards, different shields are known from the prior art, in particular in the form of protective envelopes.

Such protective envelopes typically contain at least one metal layer, which is located flatly in direct proximity to the card when the card is inserted into the envelope. Eddy currents are thus induced in the metal layer by external magnetic fields generated by read devices, which typically have a frequency of 13.56 MHz, these eddy currents attenuating the read field according to the law of induction sufficiently that a data access to the card is suppressed. All such products presently on the market share the feature that the RFID/NFC card has to be inserted into an envelope to achieve the desired shielding effect, which is accompanied by disadvantages for some applications in practice.

If the wireless functionality of the chip card is actually to be made available, it is necessary in the case of some known shields to remove the card from the shield for contactless transaction. Other non-wireless transactions using the chip card, such as using the magnetic strip or merely presenting the card, also require the removal of the card from the shield and/or from the envelope.

In addition, the overall size and/or overall thickness of the chip card is substantially enlarged by the envelope in the case of some shields known from the prior art. It is no longer possible to use the chip card in accordance with its actual function, for example, as an ATM card, since the chip card with the shield does not fit into the intake of the read device and in addition the contact points or the magnetic strip are not accessible to the read device. In addition, chip cards become thicker by a factor of 3-10 due to the envelope and no longer have space in many typical wallets.

BRIEF SUMMARY OF THE INVENTION

The object of the invention is to provide a shield element which is simple to produce and which enables effective shielding. Preferred embodiments of the invention which solve some of the above-mentioned individual problems are described in the dependent claims.

The invention achieves this object in a shield element of the type mentioned at the outset using the features as claimed. The invention relates to a shield element for attachment to an object, in particular a flat object, preferably provided as a chip card, which has a main body, an RFID or NFC transponder comprising a transponder chip, and a coiled transmission antenna connected to the RFID or NFC transponder chip. According to the invention, it is provided that the shield element comprises a carrier made of electrically nonconductive material, wherein the carrier has a closed or closable conductor track, which, upon application of the shield element to the object, shields the electromagnetic fields, which are generated by an external read device and are oriented onto the transmission antenna of the RFID or NFC transponder chip.

One advantageous arrangement of the antenna having improved shielding effect provides that the carrier is designed as a film, wherein the conductor track is in particular applied, printed, or vapor deposited onto the film or is integrated into the film, and wherein the film is preferably designed as an adhesive film, which can be glued onto the main body of the object, and/or wherein the total thickness of the film is preferably less than 0.5 mm.

A lesser thickness of an overall arrangement comprising an object and a shield element provides that the carrier is designed as a film, wherein the conductor track is in particular applied, printed, or vapor deposited onto the film or is integrated into the film, and wherein the film is preferably designed as an adhesive film, which can be glued onto the main body of the object, and/or wherein the total thickness of the film is preferably less than 0.5 mm.

A preferred adaptation to the object to be shielded provides that the conductor track is arranged, in particular exclusively, in the outer circumferential region of the carrier, and/or that the carrier has the form of the object.

The shielding effect is further improved if the conductor track is designed as a continuous conductor loop, which in particular has an ohmic resistance of at most 5 ohms.

One embodiment of a conductor track, which manages with less metal area, provides that the conductor track has the form of an antenna having one or more turns, which is in particular at a distance of at most 5 mm from the transmission antenna of the object upon application of the shield element to the object.

One arrangement which further improves shielding provides that the conductor track has the form of an antenna, which extends along the transmission antenna of the object upon application of the shield element to the object.

An additional improvement of the shielding effect is achieved if the antenna is designed in the form of a coil having at least one turn, which extends along the outer region of the carrier.

A simple option for rapidly activating the wireless communication provides that the conductor track forming the coiled antenna is closed per se in a starting state and is interruptible via an interrupter switch.

For this purpose, it can advantageously be provided that the opener is designed in particular as a push switch or as a temperature-dependent resistor having positive temperature coefficient.

Alternative effective shielding can be achieved in that the coiled antenna is part of a resonant oscillating circuit, comprising the coiled antenna and at least one capacitor.

In applications in the RFID/NFC field, it can advantageously be provided that the resonant frequency of the oscillating circuit is less than 50 MHz, in particular less than 10 MHz.

Simple detuning of the oscillating circuit can be achieved in that the oscillating circuit has at least one switch, which is arranged such that upon actuation of the switch, an element of the oscillating circuit is short-circuited or deactivated, or a further element of the oscillating circuit, in particular a further capacitor, resistor, or a further coil is switched into the oscillating circuit, so that the resonant frequency changes by at least 10%.

A simple activation can be achieved by means of electronic activation, in that the switch or switches is/are formed by an electronic switch, in particular a field effect transistor.

An activation by touch can be achieved in that a touch sensor, in particular a capacitive touch sensor, is provided, which closes or opens the electronic switch upon detection of a touch.

An advantageous refinement of the shield element, which enables simple handling and mechanical protection of the object, provides that the main body has a container for the object, or the shield element is connected to a container, in particular glued thereto or is integrated into the container.

In addition, to achieve improved shielding, it can be provided that the conductor track is arranged on the container such that, for the case in which the object is located in the container, wireless communication between the RFID or NFC transponder of the object is effectively suppressed by the conductor track of the shield element.

It is preferably provided that the container is designed in the form of an envelope or a case.

A combination is particularly advantageous, wherein the shield element is applied to the object and in particular is glued thereon or is integrated into the object.

An advantageous deactivation of the shielding and/or an activation of the object provides that the oscillating circuit is tuned such that upon application of the shield element to the carrier object, a shared resonant frequency of the oscillating circuit and the RFID or NFC transponder including transmission antenna results, which differs by at least 1%, in particular 3%, from the system frequency of the RFID transponder, wherein the system frequency of the RFID transponder, and the transmission frequency of the external read device, is in particular at 13.56 MHz.

BRIEF DESCRIPTION OF THE SEVERAL VIEWS OF THE DRAWING

Multiple exemplary embodiments of the invention will be described in greater detail on the basis of the following figures of the drawing.

DESCRIPTION OF THE INVENTION

Figure 1:
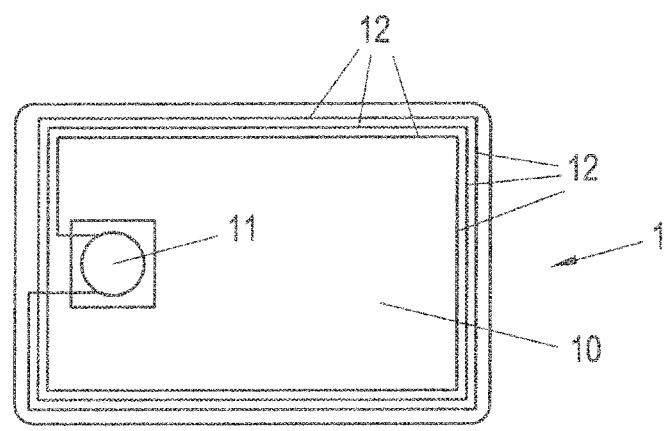
FIG. 1 shows a first object to be shielded.

FIG. 1 shows a chip card 1, which has a main body 10. An RFID or NFC transponder chip 11 and a coiled transmission antenna 12, which is connected thereto, are arranged in the main body 10, the chip and the antenna jointly forming a transponder. In addition, the chip card 1 has further functions and has a magnetic strip (not shown) and an electrical contact field for use for contact-related data transmission, for example, in the case of an ATM card. The chip card 1 does not have a voltage supply located thereon and acquires the energy required for its operation from the electromagnetic field produced by a read device. The data transmission from the chip card 1 to the read device preferably takes place via load modulation, so that the chip card 1 can be implemented as a solely passive component having low buffer capacity.

Figure 2:
FIG. 2 shows a first exemplary embodiment of a shield element.

FIG. 2 shows a first exemplary embodiment of a shield element 2, which comprises a carrier 21 made of electrically nonconductive material. In the present exemplary embodiment, the carrier is designed as a film 21a, onto which a conductor track 22 is printed. The conductor track 22 consists of electrically conductive material, wherein the ohmic total resistance along the conductor track 22 is 5Ω in the present exemplary embodiment. Of course, it is also possible to form conductor tracks 22 which have a lower resistance. Alternatively to printing conductor tracks 22 onto the film 21a, of course, it is also possible to vapor deposit the conductor tracks 22 on the film 21a, to implement them from a metal coating of the film 21a by means of etching technology, or to integrate them in the film 21a. To achieve good adhesion of the film 21 on the object 1, the film 21a is designed as an adhesive film. The adhesive film can be applied to the chip card 1 such that the circumferential edge of the adhesive film 21a is congruent with the circumferential edge of the chip card 1. In some cases, it is also possible to arrange the conductor track 22 on the carrier 21 so that the area enclosed by the conductor track 22 is significantly less, in particular only half as large, as the area enclosed by the transmission antenna 12. In such cases, the shielding effect is less strong, however, smaller shield elements 2 can be produced.

The total thickness of the film 21a is a thickness of 0.48 mm in the present exemplary embodiment. Of course, films are also to be produced in a lesser thickness, which does not make any difference for the shielding effect of shield element 2.

Figure 6:
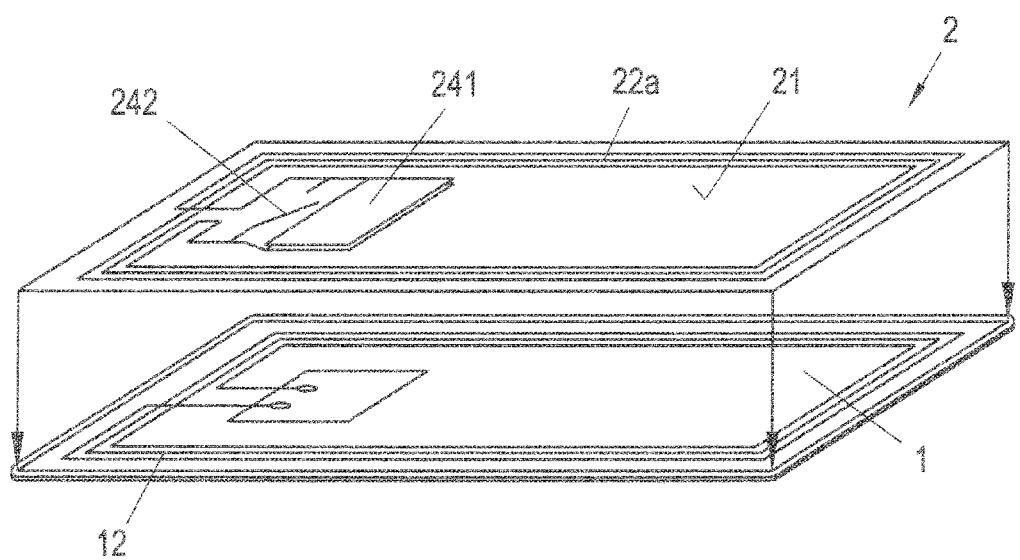
FIG. 6 shows an alternative shield element attached to the object shown in FIG. 1.

In the present exemplary embodiment, a closed conductor track 22 is arranged on the carrier 21, 21a, which, upon application of the shield element 2 to the object 1, shields electromagnetic fields which are oriented from an external read device (not shown) onto the transmission antenna of the RFID or NFC transponder 11 of the chip card 1. In the present exemplary embodiment, a part of the conductor track 22 extends exactly in parallel to the turns of the coiled transmission antenna 12. In addition, the conductor track 22 also has additional short-circuit parts, which, like the circumferentially extending conductor track 22, are led to an interrupter switch 23. The additional short-circuit parts shown in FIG. 2 are not necessary for most practical embodiments of the object 1, and the desired shielding effect is caused solely by the outer circumferential part of the conductor track 22. However, for special embodiments of objects 1, the additional short-circuit parts shown in FIG. 2 can improve the shielding effect. Alternatively, the conductor track 22 can also be embodied as a coiled antenna 22a (FIG. 6). The interrupter switch 23 is closed in the normal state, i.e., the ends of the coiled antenna 22a or conductor track 22 which are connected to the interrupter switch 23 are short-circuited in the starting state. Upon actuation of the interrupter switch 23, however, the conductor loop 22 can be interrupted, whereby the shielding effect of the shield element 2 is canceled.

Alternatively, it can also be provided in the embodiment shown in FIG. 2 that the interrupter switch 23 is designed as a push switch or as a temperature-dependent resistor having positive temperature coefficient.

Figure 3:
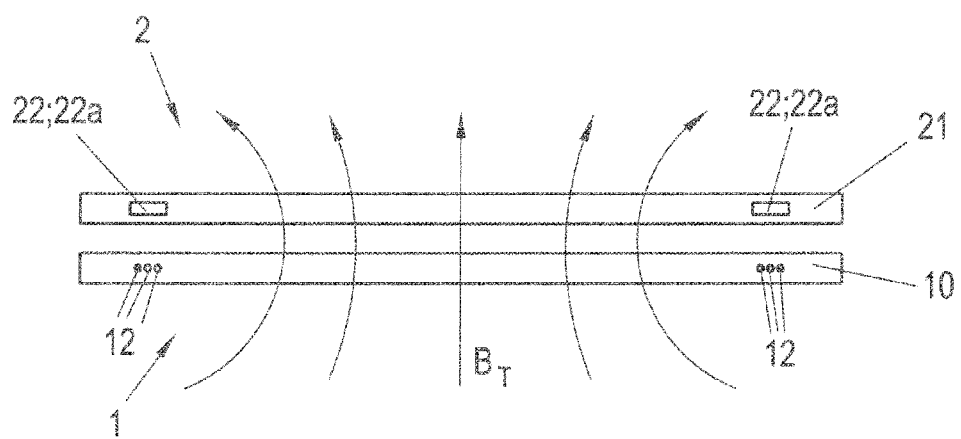
FIG. 3 shows the magnetic field $B_T$, which originates from an external RFID and/or NFC read device and is oriented onto the object, without shielding effect.
Figure 4:
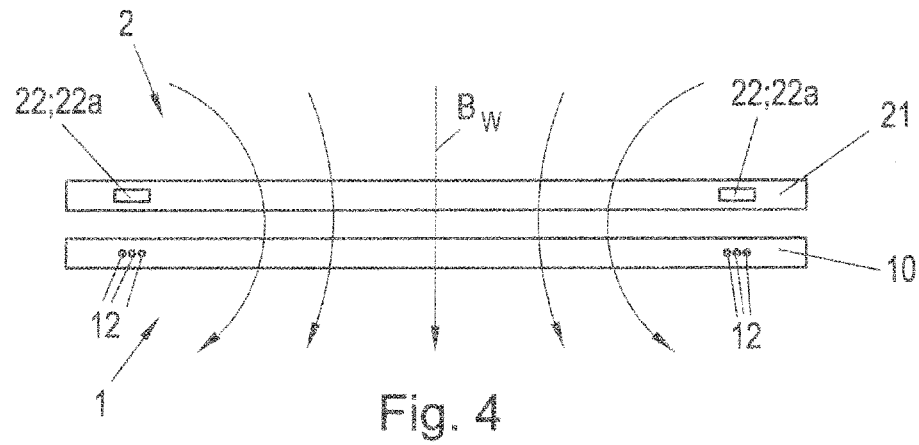
FIG. 4 shows the counter field $B_W$ generated by the shield element.
Figure 5:
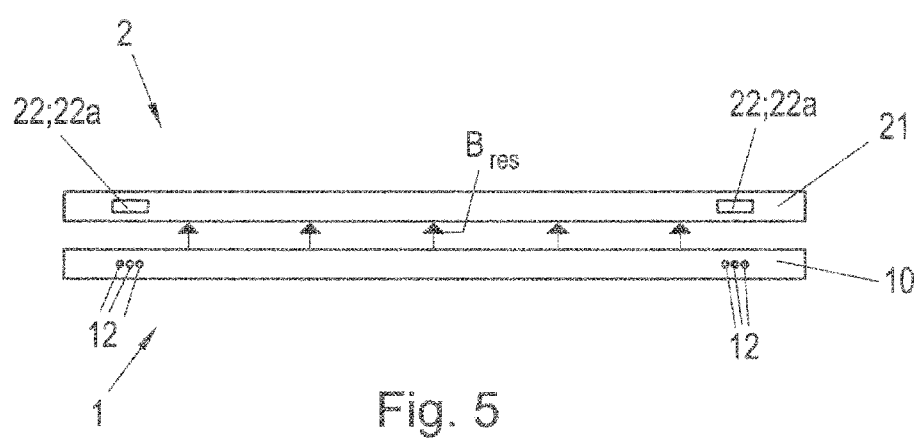
FIG. 5 shows the field resulting from the fields shown in FIGS. 3 and 4.

The shielding effect of the shield element 2 is shown in greater detail in FIGS. 3 to 5. FIG. 3 shows the magnetic field $B_T$, which is generated by an external RFID or NFC read device (not shown) and is directed onto the object or the chip card 1, without the occurring shielding effect. This state can be produced if the conductor track 22 of the shield element 2 is interrupted by the interrupter switch 23. In this state, the magnetic field $B_T$ can permeate the transmission antenna unobstructed, whereby a data communication is enabled between the transponder, comprising the transponder chip 11 and the transmission antenna 12, and an external RFID or NFC read device.

FIG. 4 shows the counter field $B_W$, which results when the conductor track 22 or antenna 22a is closed. The smaller the distance between the conductor track 22 and the transmission antenna 12, the greater the shielding effect of the shield element 2 as well. Fundamentally, upon application of the shield element 2 to the object 1, the conductor track 22 is to be at a distance of at most 5 mm from the transmission antenna 12.

FIG. 5 shows the resulting field, which results as a total of the externally excited field shown in FIG. 3 and the counter field $B_W$ shown in FIG. 4, which is generated by the shield element 2. Since complete shielding can never be achieved, this field $B_{res}$ is never equal to 0. However, a very small residual field remains, using which data communication is not possible.

If the interrupter switch 23 shown in FIG. 2 is actuated, the counter field shown in FIG. 4 is thus not provided and a data communication can be enabled via the externally excited field $B_{res}=B_T$.

An alternative embodiment, which is shown in FIG. 6, has a coil antenna 22a as a conductor track. It is known from physics that two oscillating circuits, which have the resonant frequencies $w_1$ and $w_2$, respectively, upon separate observation, have a shared resonant frequency $w_0$ upon close magnetic coupling, which is less than $f_1$ and is also less than $f_2$, i.e., $f_0<f_1$ and $f_0<f_2$.

Figures 7, 8:
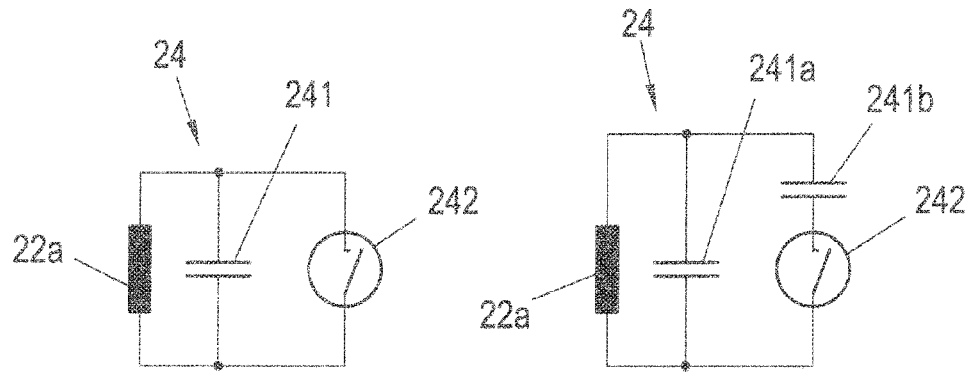
FIG. 7 schematically shows the switching behavior of the embodiment of the invention shown in FIG. 6.
FIG. 8 schematically shows an alternative embodiment of a shield element having two capacitors.

The coil antenna 22, 22a of the shield element 2 shown in FIG. 6 is, as shown in FIG. 7, connected in parallel to a push switch 242 and to a capacitor 241 designed as a plate capacitor. In the present case, an oscillating circuit 24 is formed by this specific arrangement, the resonant frequency of which is selected such that upon application of the shield element 2 on the object 1, with open switch 241, the resulting resonant frequency of the combination consisting of the shield element 2 and the object 1 deviates enough from the system frequency of the RFID or NFC transponder, typically of 13.56 MHz, that no data communication is possible with an external RFID or NFC read device. As shown in FIG. 6, the shield element 2 has a carrier 21 in the form of a film 21a. This film 21a is glued onto the chip card 1.

If the switch 242 is open, the resonant frequency, which is predefined by the capacitor 241 and the coil antenna 22a, of the oscillating circuit 24 formed on the shield element 2 is in a range less than 50 MHz, in particular less than 10 MHz, whereby the resulting resonant frequency of the combination consisting of the shield element 2 and the object 1 is also sufficiently far below the system frequency of the RFID or NFC transponder that no data communication is possible between the transponder and an external RFID or NFC read device. If the switch 242 is closed, the resonant frequency of the oscillating circuit 24 thus changes and is in a range which is not suitable for moving the resulting resonant frequency of the combination consisting of the shield element 2 and the object 1 sufficiently far away from the system frequency of the RFID or NFC transponder, whereby a data communication becomes possible between the RFID or NFC transponder in the chip card 1 and an external read device.

An alternative embodiment of an oscillating circuit is only schematically shown in FIG. 8. The oscillating circuit 24 shown in FIG. 8 has the antenna 22a, shown in the form of a coil 22a, and two capacitors 241a, 241b. The first capacitor 241a is connected in parallel to the coil 22a. The second capacitor 241b is connected in series to the switch 242. The series circuit comprising the second capacitor 241b and the switch 242 is connected in parallel to the coil 22a. Both capacitors 241a, 241b are formed on the film 21 in the form of two conductor layers opposite to one another.

It is fundamentally sufficient for the oscillating circuit 24 to have a switch 242, which is arranged such that upon the actuation of the switch 242, i.e., upon opening or closing of the switch 242, an element of the oscillating circuit 24 is short-circuited or deactivated, or a further element, such as a capacitor, a resistor, or a further coil, is switched into the oscillating circuit 24, and the resonant frequency thus changes. In some cases, a change of the resonant frequency by approximately 10% is sufficient to cause the shielding effect of the shield element 2 to disappear and to enable a data communication with an external read device.

Figure 9:
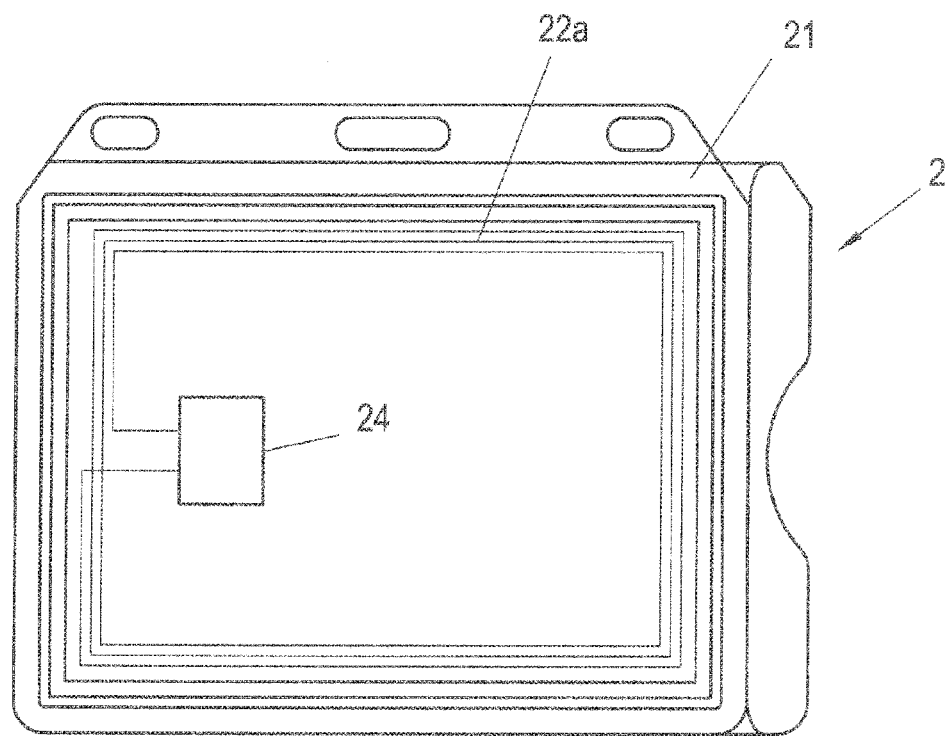
FIG. 9 shows a shield element which has a container for the object.

FIG. 9 shows a further embodiment of the invention in greater detail, in which the carrier 21 has the shape of a container for the object 1. Alternatively, the shield element 2 or the carrier 21 thereof can also be connected to the container, in particular glued thereto or integrated therein. As also in the shield elements shown in FIGS. 2 and 6, a conductor track 22, which is designed in the form of a coil antenna 22a, is located in the outer circumferential region. As a result of the special design of the carrier body as a container, a chip card 1 can be inserted into the carrier 21 of the shield element 2. The shielding effect is designed identically in this case to the shielding shown in FIG. 6 or in FIG. 2. The magnetic fields resulting due to the shielding also correspond to the magnetic fields shown in FIGS. 3 to 5. The conductor track 22 is arranged in this case on the container such that, for the case in which the object 1 is located in the container, a wireless communication between the RFID or NFC transponder of the object 1 and an external RFID or NFC read device (not shown) is effectively suppressed as a result of the arrangement of the shield element 2, in particular the conductor track 22 thereof. Shield elements 2 which have a container for the object 1 are typically manufactured in the form of envelopes or cases. In particular chip cards 1 may be transported comfortably therein in wallets.

Figure 10:
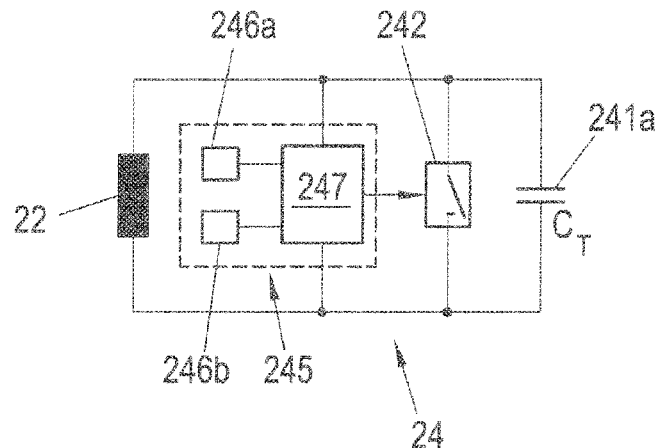
FIG. 10 and FIG. 11 schematically show an embodiment of the shield element in which the shielding can be canceled by means of touch.

A further preferred embodiment of the invention is shown in FIG. 10. FIG. 10 shows a shield element 2, in which the shielding can be canceled by means of touching a touch sensor 245, which is situated on the shield element 2, comprising two electrodes 246a, 246b and a detection unit 247. In this advantageous embodiment, which corresponds otherwise to the embodiment shown in FIG. 6, the switch 242 is implemented as an electronic switch, in the present case by a field effect transistor. Furthermore, the two electrodes 246a, 246b of the touch sensor 245 are arranged adjacent to one another in the interior of the film 21a. For example, if a human finger touches the electrodes 246a, 246b or this finger enters the region of the electrodes 246a, 246b, this can be detected by the detection unit 247. The detection unit acquires the energy required for its operation from the coil antenna 22a and/or the field linked to the coil antenna 22a. Upon detection of a touch, the detection unit 242 activates the electronic switch 242, which short-circuits the capacitor 241a; $C_T$ and therefore changes the resonant frequency of the oscillating circuit formed from the coil antenna 22a and the capacitor $C_T$.

Figure 11:
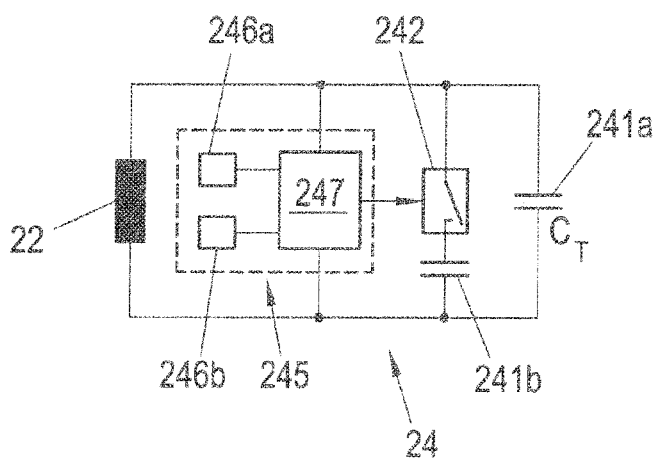

Furthermore, in all embodiments of the shield element 2, the option exists of changing the resonant frequency of the oscillating circuit formed from the coil antenna 22a and the capacitor $C_T$ in that a further element, such as a capacitor 241b, a resistor, or a further coil is switched into the oscillating circuit by an electronic switch, which is implemented in the form of a field effect transistor, for example. One example of such an embodiment is shown in FIG. 11. The activation of the field effect transistor can be performed in particular in this case via a touch sensor 245, which closes or opens the electronic switch 242 upon detection of a touch. Such a touch switch 245 can be implemented as a capacitive touch sensor 245 as a result of the specific conditions, in particular on a film, wherein electrode areas 246a, 246b, which are arranged adjacent to one another in a plane in or on the carrier film, form a capacitor, the capacitance of which changes upon touching of the electrode areas and/or upon approach to the electrode areas.

If the shield element 2 and the object 1 are joined together, as a result of the shielding effect of the shield element 2, a data communication of the RFID or NFC transponder or the transmission antenna thereof with an external read device becomes impossible. In addition, a suppression of the shielding effect can be generated by a special activation, so that a data communication of the external RFID or NFC transponder and the transmission antenna 22 thereof with an external read device is again enabled. As shown in FIG. 2, it is particularly advantageous to glue the shield element 2 to the object, so that the shield element 2 is applied permanently. Alternatively, as shown in FIG. 9, the shield element 2 can be designed as a container, wherein the object to be shielded, in particular in the form of a chip card 1, is introduced into the container of the shield element 2.

Figure 12:
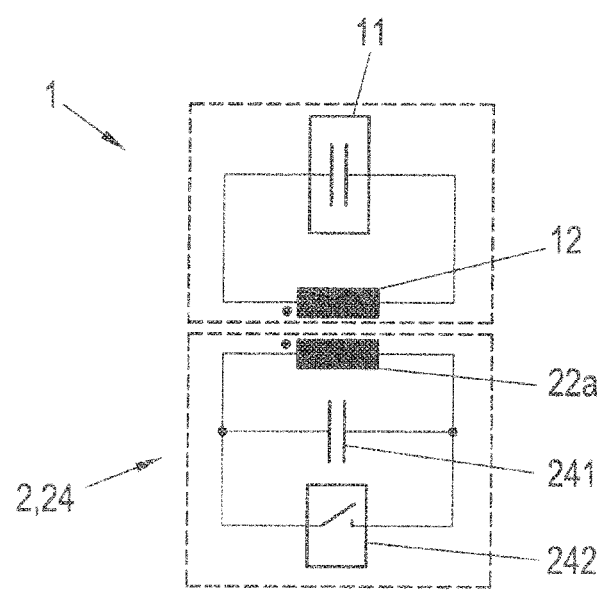
FIG. 12 shows an equivalent circuit diagram of the shield element shown in FIG. 10 and a chip card, which shows a transponder having an antenna and a transponder chip.

FIG. 12 shows an equivalent circuit diagram of the shield element 2 and a chip card 1 as a coupled overall system. The chip card 1 has a transponder having a transmission antenna 12 and a transponder chip 11. It is clear from this illustration that the transmission antenna 12 of the object 1 and the coiled antenna 22a of the shield element 2 are inductively coupled to one another. It is presumed that the influences of the touch sensor 245 and the switch on the overall system are small and only affect the capacitance of the illustrated capacitor 241.

In all of these embodiments, it is possible to prepare the shield element 2 for its application to a specific object 1. Due to the mutual coupling of the individual parts of the RFID or NFC transponder and the transmission antenna 12 and the elements of the oscillating circuit 24, an expanded oscillating circuit is formed, in which a shared resonant frequency results. The oscillating circuit 24 is tuned to the RFID transponder and the transmission antenna 12 such that upon application of the shield element 2 to the carrier object 1, a shared resonant frequency of the oscillating circuit 24 and the RFID or NFC transponder including transmission antenna 12 results, which differs by at least 1%, in particular at least 3%, from the system frequency of the RFID transponder or the external read device. The system frequency of the RFID transponder and the transmission frequency of the external read device are normally at 13.56 MHz in standard applications.

By switching in or out further capacitors, inductors, or resistors by means of the above-mentioned switch 242 into or from the oscillating circuit thus produced, said circuit can be detuned so that a shielding effect disappears and a data communication of the RFID or NFC transponder via its transmission antenna 12 with an external read device becomes possible.

Figure 13:
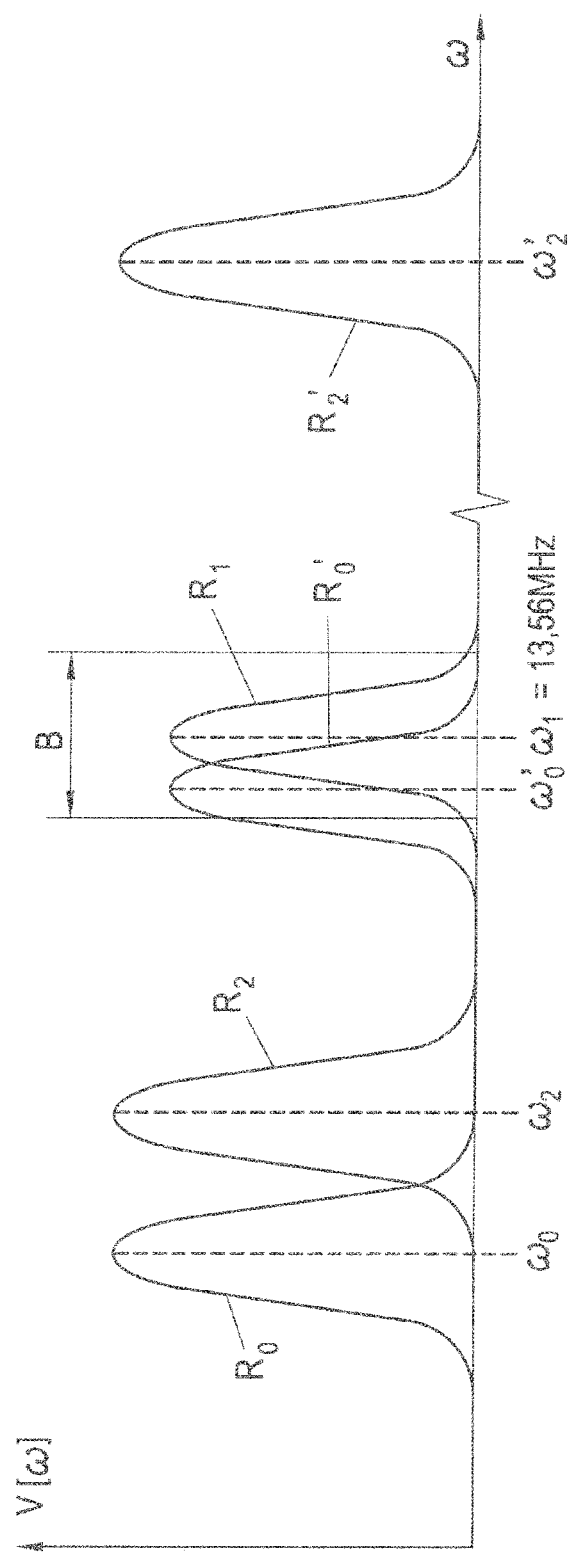
FIG. 13 shows the resonance capability of the system shown in FIG. 12 as a function of the frequency.

FIG. 13 shows the resonance capability of the system shown in FIG. 12 as a function of the frequency. The resonance curve $R_1$ of the transponder, consisting of transponder chip 11 and transmission antenna 12, of the object 1 has the resonant frequency $w_1$. It is apparent that the resonant frequency of the transponder is in the range B of the permissible transmission frequencies. In the starting state, i.e., switch 242 open, the shield element 2 has a resonance curve $R_2$ having a resonant frequency $w_2$, which has approximately the same order of magnitude as the resonant frequency $w_1$ of the transponder. The resonance curve $R_2$ of the shield element 2 having open switch is identified with $w_2$ in FIG. 13. If one assumes ideal coupling between the shield element 2 and the chip card 1 or the transponder 11, the resonant frequency $w_0$ of the resonance curve $R_0$ of the resulting system thus results according to $$w_0 = \sqrt{\frac{w_1^2 \cdot w_2^2}{w_1^2 + w_2^2}}$$

The resonant frequency $w_0$ of the resulting system is less than the two resonant frequencies $w_1$, $w_2$. Due to this shift of the resonant frequency, a communication of the chip card 1 with a read device, the transmission frequency range of which is within the range B of the permissible transmission frequencies, is not possible.

The resonance curve $R_2'$ shows the resonance of the shield element 2 with closed switch 242. If the switch 242 is closed, the resonant frequency $w_2'$ of the oscillating circuit 242 is substantially higher than with open switch 242, since the capacitance in the oscillating circuit 24 is substantially reduced as a result of the short-circuit of the switch 242. Since the intrinsic resonant frequency $w_1$ of the object 1 or of the transponder is identical to the case of the open switch 242, a value which essentially corresponds to the resonant frequency $w_1$ results as the resonant frequency $w_0'$ of the overall system with closed switch. Since the resonant frequency $w_0'$ of the overall system is hardly shifted in relation to the resonant frequency $w_1$ of the transponder, a data communication is possible in the range B of the permissible transmission frequencies.

The shield element 2 normally does not have a separate power supply and functions as a solely passive component. However, it is also conceivable to provide a separate power supply in the form of a battery on the carrier 21 of the shield element.

The invention claimed is:

1. A shield element for attachment to an object, the object containing a transponder chip and a transmission antenna connected to the transponder chip, the shield element comprising:
   a carrier made of electrically nonconductive material;
   a closed or closable conductor track on said carrier, said conductor track, when the shield element is mounted to the object, shielding against electromagnetic fields generated by an external read device and oriented onto the transmission antenna of the transponder chip of the object, said conductor track forming an antenna; and
   a resonant oscillating circuit including at least one capacitor and said antenna;
   said resonant oscillating circuit including at least one switch arranged so that, upon actuation of said switch, an element of said oscillating circuit is short-circuited or deactivated, or a further element of the oscillating circuit selected from the group consisting of a further capacitor, a resistor, and a further coil is switched into said oscillating circuit, so that a resonant frequency thereof changes by at least 10%.

2. The shield element according to claim 1, wherein the object is a flat chip card having a main body, an RFID or NFC transponder connected to the transponder chip, and the transmission antenna is a coiled transmission antenna connected to the RFID or NFC transponder chip.

3. The shield element according to claim 1, wherein said conductor track is arranged on said carrier to form an area enclosed by said conductor track at least half as large as an area enclosed by the transmission antenna of the object.

4. The shield element according to claim 1, wherein said carrier is a film and said conductor track is applied, printed, or vapor deposited onto said film or is integrated into said film, and wherein one or both of the following is true:
   said film is an adhesive film to be glued onto a main body of the object; or
   a total thickness of said film is less than 0.5 mm.

5. The shield element according to claim 1, wherein said conductor track is arranged in an outer circumferential region of said carrier, and/or said carrier has a shape of the object.

6. The shield element according to claim 1, wherein said conductor track is a continuous conductor loop having an ohmic resistance of at most 5 ohms.

7. The shield element according to claim 1, wherein said antenna with antenna has one or more turns disposed at a distance of at most 5 mm from the transmission antenna of the object when the shield element is applied to the object.

8. The shield element according to claim 1, wherein said antenna extends along the transmission antenna of the object when the shield element is applied to the object.

9. The shield element according to claim 8, wherein said antenna is a coiled antenna with at least one turn extending along an outer region of said carrier.

10. The shield element according to claim 6, wherein said resonant frequency of said resonant oscillating circuit is less than 50 MHz.

11. The shield element according to claim 8, wherein said conductor track forms a coiled antenna that is closed per se in a starting state and is interruptible via an interrupter switch.

12. The shield element according to claim 11, wherein said interrupter switch is a push switch or as a temperature-dependent resistor having a positive temperature coefficient.

13. The shield element according to claim 1, wherein said at least one switch is an electronic switch.

14. The shield element according to claim 13, which further comprises a touch sensor connected to close or open said electronic switch upon detection of a touch.

15. The shield element according to claim 14, wherein the container is an envelope or a case.

16. The shield element according to claim 1, wherein:
   said main body has a container for receiving the object; or
   the shield element is connected to a container, glued to a container, or integrated into a container.

17. The shield element according to claim 16, wherein said conductor track is arranged on the container such that, when the object is located in the container, wireless communication between the RFID or NFC transponder of the object is effectively suppressed by said conductor track of the shield element.

18. An assembly, comprising:
   an object having a main body with an RFID or NFC transponder and a transmission antenna connected to said transponder; and
   a shield element according to claim 1 mounted to said object and in particular is glued thereon or is integrated into the object.

19. The assembly according to claim 18, wherein:
   said shield element contains a resonant oscillating circuit with a coiled antenna and at least one capacitor;
   said oscillating circuit being tuned such that, when said shield element is applied to said object, a shared resonant frequency of said oscillating circuit and said RFID or NFC transponder including transmission antenna results, which differs by at least 1% from a system frequency of the RFID transponder; and
   wherein the system frequency of the RFID transponder, and the transmission frequency of the external read device, is 13.56 MHz.

* * * * *